Sept. 12, 1939.  E. T. HERMANN  2,172,638
APPARATUS FOR PRODUCING SIZED CERAMIC PARTICLES
Filed Oct. 1, 1934  2 Sheets-Sheet 1
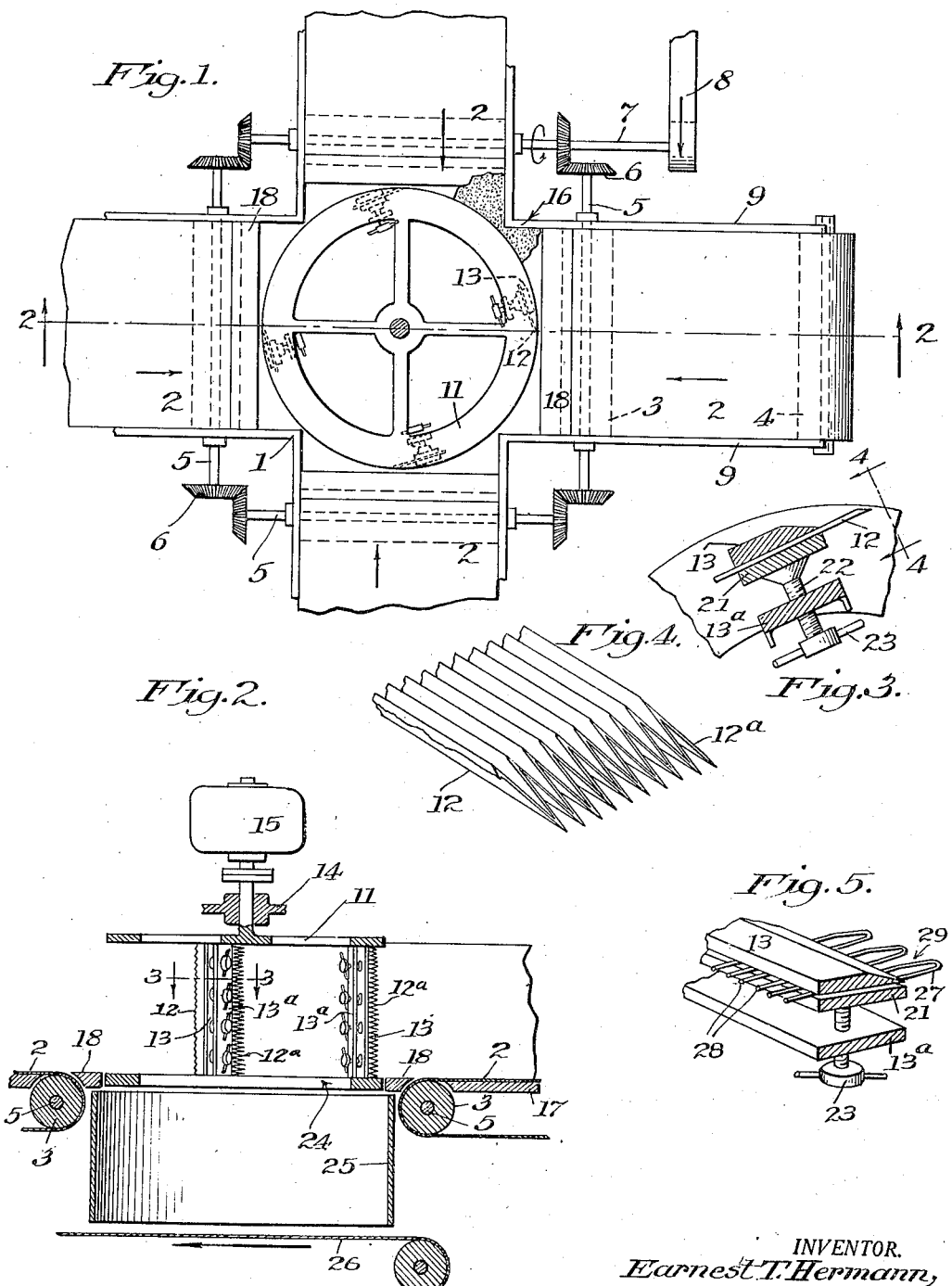
INVENTOR.
Earnest T. Hermann,
BY
ATTORNEYS.

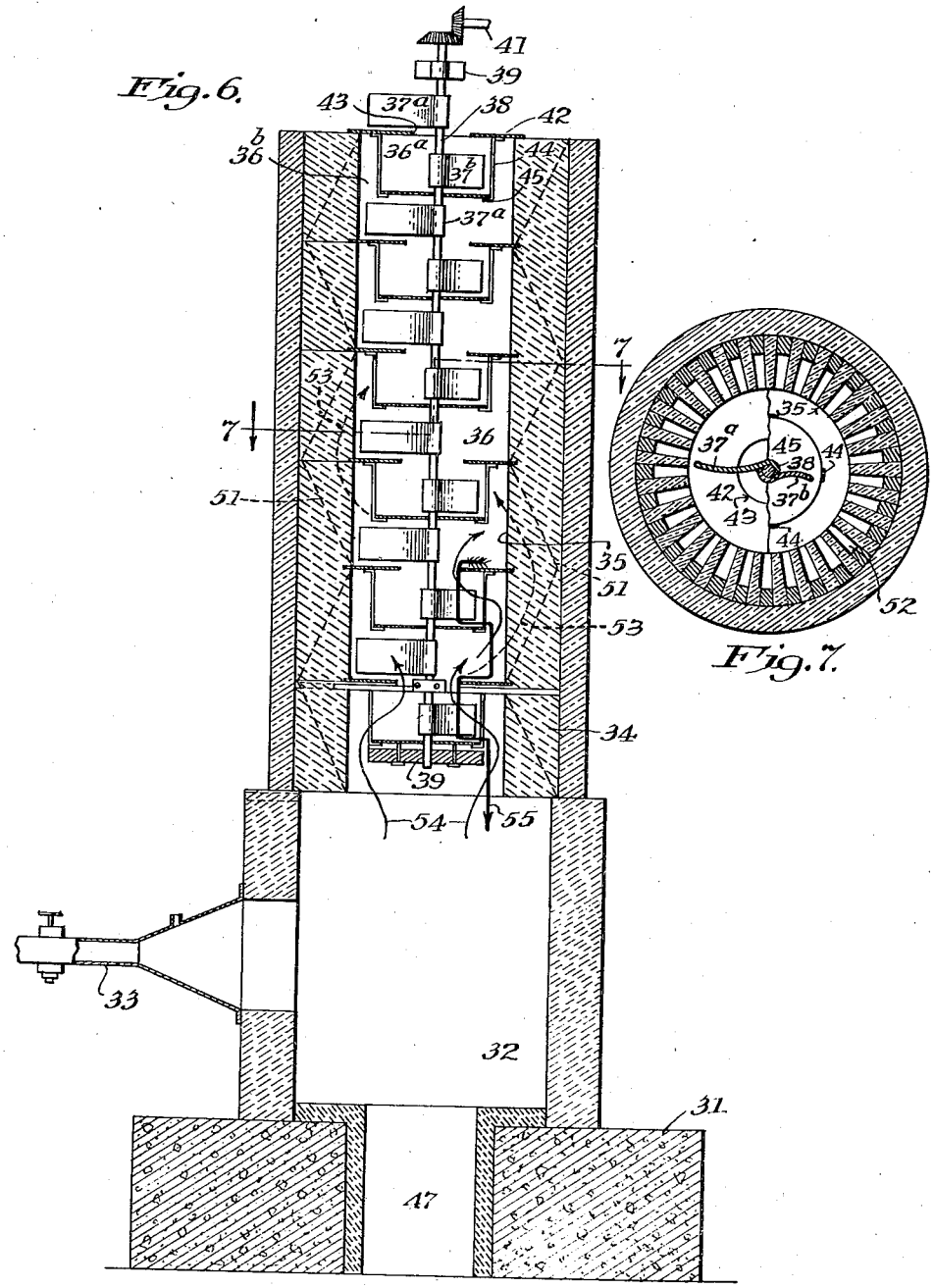

Patented Sept. 12, 1939

2,172,638

UNITED STATES PATENT OFFICE 2,172,638

APPARATUS FOR PRODUCING SIZED CERAMIC PARTICLES

Earnest T. Hermann, El Segundo, Calif.

Application October 1, 1934, Serial No. 746,309

2 Claims. (Cl. 18—1)

This application is a continuation-in-part of my copending application Ser. No. 548,905, filed July 6, 1931, which has become Patent 2,087,973, and pertains to an advantageous apparatus for use in the production of sized discrete partly or completely vitrified ceramic particles.

The principal object of the present invention is to provide an apparatus adapted to effect important economies in the production of sized ceramic particles, whereby particles of a substantially uniform size may be produced as a finished ceramic product.

Ceramic particles may be produced according to the present invention by subjecting a plastic argillaceous body to a subdividing operation or treatment whereby discrete particles of substantially uniform size, in at least one and preferably in at least two dimensions, are obtained, and these discrete particles of argillaceous material are then subjected to a burning or firing operation whereby each of the particles is reduced to a partly or wholly vitrified discrete ceramic unit. The apparatus of the present invention makes possible the production of plastic particles by the subdivision of the plastic argillaceous body, such particles being, for example, of such size as to have, after having been shrunken during the subsequent firing operation, at least one and preferably two dimensions substantially equivalent to or preferably slightly less than the screen opening through which the material is to be passed in a screening operation.

The sized particles produced with the apparatus of the present invention may be employed to advantage in a number of applications to the building trades, such as, for example, a body of material in the production of acoustical blocks as set forth in my issued United States Letters Patent No. 1,929,425, or, as further examples, as a surfacing material for coating weatherproof roofing materials or the like, as a filtration medium, as a heat insulation medium, or as a support for catalytic agents. In the formation of a body material useful in the production of acoustical blocks, the particles may be formed as elongated shavings or cuttings, fired, and then subsequently crushed to size or, the cuttings may be made relatively long and filamentary, fired and used without further crushing, if a body having a high proportion of voids is desired. In the production of a material for use as a filtration medium, the individual particles may be formed in a filamentary shape or may be formed into shavings of irregular length and of substantially uniform cross-section, which may be subsequently crushed to the desired particle size. In this connection the particles may be so formed as to have a cross-section somewhat within the range of particle dimension which is ultimately desired, and the subsequent crushing operation will serve to reduce the length of the particles so that the desired screen mesh is obtained. Thus a number of various screen sizes may be effectively produced at a low cost for use in building up filter beds for gravity filtration or the like.

One of the particular objects of the present invention is to provide an apparatus for the production of a sized ceramic product, in which the principal proportion of the energy and effort required to reduce the base material to the desired size is expended upon the material when it is in a plastic or semi-plastic state, whereby considerable economy in such size reduction operation is effected. For example, when a material such as a burned clay is reduced to a definite screen size, such as 8 mesh, through the medium of crushing rolls or the like, a very considerable proportion of the material is reduced to a fineness materially smaller than desired. As a specific example, with reference to the use of sized granules for a roofing material, the granule-size specifications of one of the largest roofing material manufacturers in this country is as follows:

|  | Minimum | Maximum |
|---|---|---|
|  | *Percent* | *Percent* |
| −8 mesh | 100 |  |
| −8 mesh +10 mesh |  | 3 |
| −10 mesh +14 mesh | 25 | 40 |
| −14 mesh +20 mesh | 30 | 45 |
| −20 mesh +28 mesh | 20 | 30 |
| −28 mesh +35 mesh | 5 | 10 |
| −35 mesh +pan |  | 2½ |

The following typical analysis of crushed rock obtained by the use of crushing rolls to reduce the material to minus 8 mesh, as given by the W. S. Tyler Company, Cleveland, Ohio, manufacturers of screens and screening apparatus, may be compared with the above specification for roofing granules:

Screen analysis

| −8 mesh +35 mesh portion | Percent | −35 mesh portion | Percent |
|---|---|---|---|
| −8 +10 mesh | 14 | −35 +48 mesh | 7 |
| −10 +14 mesh | 12 | −48 +65 mesh | 6 |
| −14 +20 mesh | 10 | −65 +100 mesh | 6.5 |
| −20 +28 mesh | 11 | −100 +150 mesh | 4 |
| −28 +35 mesh | 10 | −150 +200 mesh | 3.5 |
|  |  | −200 mesh | 16 |
| Total | 57 | Total | 43 |

It is apparent therefore that the relatively coarse material crushed to a size specification required for roofing will contain practically 40 per cent of material which is too fine to pass the specification, and this material must necessarily be discarded. As above pointed out, the apparatus of the present invention is adapted for subdividing a plastic or semi-plastic argillaceous mix so that at least one and preferably two of the dimensions of the subdivided particles approximate the mesh size of the largest particles required, so that the crushing operation necessary to reduce the material to the required screen specification is very light, and consists principally in reducing the third dimension of the particles. This sort of crushing produces a relatively small quantity of fines and requires a relatively small energy expenditure.

A further object of the invention is to provide an advantageous apparatus for subdividing a plastic or semi-plastic argillaceous body into a plurality of discrete particles of advantageous proportional dimensions, and means for receiving said discrete particles and reducing the same to fully or partially vitrified discrete ceramic particles.

Other objects of the invention will be apparent from the following description of the invention, or will be specifically pointed out therein.

The attached figures of drawings show a form of apparatus which may be employed in the production of sized particles according to the present invention, and referring thereto:

Fig. 1 is a partly broken-away plan view of the particle-forming machine;

Fig. 2 is a sectional elevation thereof taken on line 2—2 of Fig. 1;

Fig. 3 is a sectional detail of a portion of the device taken on line 3—3 in Fig. 2;

Fig. 4 is a partially broken-away perspective detail of a cutting blade which may be used in the apparatus, taken generally on line 4—4 in Fig. 3;

Fig. 5 is a perspective view corresponding generally to Fig. 3 showing an alternative type of particle cutting means;

Fig. 6 is a partly sectional elevation of an advantageous form of firing means for receiving the particles formed by the apparatus shown in Figs. 1 to 3 and reducing the same to a partly or completely vitrified state.

Fig. 7 is a horizontal section taken on line 7—7 in Fig. 6.

Referring to Figs. 1 to 3, the particle-forming machine may comprise a table structure 1 provided with a plurality of separate moving table surfaces such as moving belt conveyors 2 or the like. The several conveyors 2 are arranged to feed material inwardly of the device at a uniform rate and for this purpose the belt 2 may be provided with an inner power-driven roller 3 and an outer idler roller 4, the several rollers 3 being mounted on suitable shafts 5 and provided with gear means 6 operably associated with a drive shaft 7 which may be driven by a belt 8. A suitable partition or siding is provided along the lateral edge of each of the conveyor belts 2 whereby a box-like receptacle or area is defined by said partitions and said belt, within which may be disposed the plastic or semi-plastic raw material from which the discrete particles are to be formed. In this particular modification of the device I have shown the conveyor belts as four in number, meeting each other at right angles, and each adapted to force a body of plastic material inwardly toward a cutting head 11 carrying a plurality of cutting blades 12 carried on suitable supporting members 13 and secured to said head. The cutting head 11 is rotatably mounted in a suitable bearing or the like 14 and is provided with suitable driving means such as a variable speed electric motor 15. The partitions 9 are preferably so spaced that one side partition of one of the belt conveyors 2 meets the adjacent side partition of an adjacent belt at a point outwardly removed a short distance from the radius of operation of the cutting blades 12, so that the bodies of plastic material on the adjacent belts will meet and plastically join at their intersection, as shown by the stippled area at 16. In this manner the cutting blades 12 are provided with a substantially continuous exposed area of plastic material, and substantially no interruption of the cutting action is realized as a blade passes from one body of plastic material to the adjacent body.

The belts 2 are provided preferably with a supporting member 17 in position to support the belt intermediate the two rollers 3 and 4, and a fixed support is preferably provided along the inner end of the belt as at 18 to support the body of plastic material at a point adjacent the cutting head.

The cutting blades 12 may be formed in any desired shape, but it has been found feasible to employ a serrated edge, as shown at 12a, which will cut a plurality of triangular strips or elongated particles, for one cutting blade, and a plain flat strip for the succeeding cutting blade, which will cut the remaining triangular particles at their bases and leave substantially flat surfaces. In this use where, for example, four cutting blades are employed, two opposing blades may be of the serrated type and the other two opposing blades of the flat type so that each blade in passing removes particles of the same general shape.

The cutting blades 12 may be supported on the cutting head 11 through the agency of two blade-supporting members 13 and 13a extending vertically between the upper and lower ends of the head 11, the cutting blade being actually supported between one of the members 13 and a follower plate 21 held in place by means of a plurality of compression screws 22 threadedly mounted in the other supporting member 13a and each provided with a wing nut 23 or the like for adjustment.

The form of blade shown in Figs. 3 and 4 is but one of many forms which may be employed for the purpose of removing the plastic shavings or cuttings from the block of plastic argillaceous material, and suitable modifications of such cutting blade means will be apparent to one using the device. As an example of such modification, Fig. 5 shows the employment of a plurality of wire loops 27 each formed by a wire 28 doubled upon itself and secured at both ends by the member 13 and the follower plate 21. Each of the wire loops 28 may be separated from the adjacent loop by a space 29, if desired, and thus a succeeding series of spaced wire loops may be provided on the next blade supporting member so that each wire loop in a series will cut the plastic material at a point intermediate the cuts made by two adjacent cutting loops in a preceding series.

The blades 12 are preferably inclined at an angle to the cutting path of the blade ends whereby the cut particles are thrown inwardly of the cutting head, and said cutting head is provided with an open bottom as shown at 24, through which the cut particles may pass downwardly from the device. Immediately below the cutting head I may provide a shield 25 for directing the particles downwardly upon a suitable conveyor belt 26 adapted to receive said cut particles and convey the same from the device.

Any suitable means may be provided for receiving the cut particles and subjecting the same to a drying and firing operation, but I have found that the following described firing means is highly efficient in reducing the particles to the desired vitrified state, and referring to Figs. 6 and 7 this apparatus may comprise a suitable base 31 upon which is mounted a suitable combustion housing 32 provided with burner means 33. A calcining tower 34 is mounted on the combustion chamber 32 and may comprise a vertical shaft 35 divided into a plurality of compartments 36, each of which compartments is provided with one and preferably two agitator arms 37 mounted on a shaft 38 rotatably supported by two or more suitable bearings 39 and provided with drive means 41. Each of the compartments 36 may be divided into two zones 36a and 36b by means of a metal partition consisting of a flat plate member 42 provided with a central opening 43 and a depending frame structure 44 provided with a closed end wall 45. Where the compartments are divided as above described, the agitator arm 37a above the apertured partition 42 may be so curved with respect to the direction of rotation of the shaft 38 that material deposited on the plate 42 will be crowded inwardly toward the aperture 43 and allowed to fall downwardly upon the plate 45, and the arm 37b within the portion 36a of the compartment 36 may be oppositely curved with respect to the rotation of said shaft so as to crowd material received on the plate 45 outwardly thereof and over the edge and thus downwardly against the succeeding lower plate 42. Assuming the cut particles to be delivered to the uppermost plate 42 through the agency of the conveyor belt 26 or in any other suitable manner, rotation of the shaft 38 will obtain a progressive downward movement of such particles through the shaft 35, and as this material approaches the combustion chamber 32, it will be further and further heated until the desired vitrification is obtained in the lowermost compartment portion 36a whence the material may be discharged downwardly through the combustion zone into a receiving space 47, from which it may be removed in any suitable manner.

The shaft 35 is preferably provided with means for by-passing a portion of the combustion gases from the combustion chamber 32, so that not all of these gases are required to pass through the apertures 43 an the plates 42, and for this purpose alternate tiles or brick employed in the construction of this shaft may be partially omitted as shown by dotted lines at 51 in Fig. 6 and by the spaces 52 in Fig. 7. The spaces provided by partial omission of the bricks in the wall 34 are preferably such as to provide by-passing of the gases at one side of the shaft at one level and at the opposite side of the shaft at another level. In this connection the dotted arrows 53 may represent the circulation of combustion gases past the plate 42 at two different levels, and the passage of the remainder of the gas through the apertures 43 is shown by the solid arrows 54. The downward passage of the discrete particles is indicated roughly by the heavy feathered arrow 55.

A shaft kiln of the type herein described is found to be a highly efficient form of apparatus for obtaining the desired vitrification of the particles, and the period of treatment of the particles may be quite accurately regulated by variation of the speed of rotation of the shaft 38. It has been found that the shaft, rotating arms, and the plates 42 and 45 may be formed of alloy steel such as the so-called "Allegheny metal".

As a specific example of the production of ceramic particles by use of the apparatus of the present invention, a semi-plastic mass of an argillaceous material such as a plastic clay, containing from 15 to 25 per cent water, is prepared and placed on the several belt conveyors 2. The motor 15 is started and the drive shaft 7 is set in motion so that the plastic material on the several belts 2 is formed inwardly toward the cutting head 11. As the plastic material is brought into position adjacent the head 11, the cutting blades 12 will strike the material and cut away the desired particles which will fall downwardly and outwardly of the cutting head onto the conveyor belt 26, and may be conveyed to position above the kiln shaft 35. The burner 33 will have been in operation for a sufficient period to thoroughly bring the kiln up to the desired temperature and rotation of the driving means 41 will obtain the desired downward progression of the particles through the kiln.

Where a material is to pass an 8 mesh screen, for example, the light ribbons or shavings should be formed approximately .09" or .1" in width and thickness so that after the firing shrinkage has taken place the width and thickness of these particles will be somewhat less than 0.093", which is the size of the opening in an 8 mesh standard screen. After firing only a light crushing treatment is necessary to reduce the particles to proper lengths.

The particles produced by subdivision of the plastic argillaceous body and which are to be subjected to a firing operation to produce the ultimate sized particles of the present invention, may either be formed as elongated shavings, strands or particles, having one, and preferably both of their cross-sectional dimensions substantially equal to the particle size of the finished particles which it is desired to produce, so that, after firing, such shavings, strands or particles may readily be reduced, as by a light crushing operation, to particles of the desired size; or, the elongated shavings, strands or particles producing the subdividing operation may be subjected to a further subdividing operation, while still in an unfired condition, to form particles of the desired size and shape of the finished product, as by cutting or breaking the same in any suitable manner, so that upon firing the desired finished product is obtained without requiring any substantial further reduction in any of the dimensions of the particles. I have also found that, in the subdivision of a body of plastic argillaceous material, either by a slicing or extruding operation, the length of the strands or particles so formed may be controlled to a considerable extent by controlling the consistency of the mass undergoing subdivision. By this method of control, it is possible in some cases to form, by a single subdividing operation, particles having all three of their dimensions substantially within the range of particle size of the finished product, and the particles thus formed may then be fired to obtain the desired product.

Numerous modifications of the specific apparatus herein shown will occur to one skilled in the art, and numerous applications of the finished material to the arts will suggest themselves, and for this reason I consider myself in no sense limited to the specific disclosure but rather to the scope of the appended claims.

The herein-described ceramic particle product and the method of producing the same are described and claimed in my pending application Serial No. 251,796, filed January 19, 1939.

I claim:

1. An apparatus for producing sized ceramic particles which comprises: means for receiving a mass of plastic material; cutting means disposed adjacent one end of said material receiving means; means for moving a material on said material receiving means toward and into an engagement with said cutting means; means positioned adjacent said cutting means for receiving particles of argillaceous material formed by said cutting means and conveying the same away from said cutting means; and furnace means associated with said cutting means and said conveying means for receiving said particles and subjecting the same to a firing operation.

2. An apparatus for producing sized ceramic particles which comprises: conveyor means adapted to receive a mass of plastic material; cutting means disposed adjacent one end of said conveyor means and provided with a movable cutting element; means for moving said conveyor means to cause movement of material thereon toward said cutting means; means for driving said cutting means to cause movement of said cutting blade in contact with a mass of material on said conveyor means and the formation of plastic argillaceous particles; means associated with said cutting means for receiving said particles and conveying the same from said cutting means; and furnace means associated with said last-named conveying means adapted to receive said particles and subject the same to a firing operation to cause the formation of ceramic particles therefrom.

EARNEST T. HERMANN.